3,158,595
PROCESS OF DIAZOTIZING, COUPLING AND HYDROLYZING
Milton Green, Newton Highlands, and Helen P. Husek, Lincoln, Mass., assignors to Polaroid Corporation, Cambridge, Mass., a corporation of Delaware
No Drawing. Filed Dec. 12, 1960, Ser. No. 75,128
8 Claims. (Cl. 260—162)

This invention relates to chemistry and, more particularly, to novel chemical compounds and specified processes for syntheses thereof.

This application is in part a continuation of our copending U.S. application Serial No. 709,002 filed January 15, 1958, and now abandoned.

A principal object of the present invention is to provide certain specified novel chemical compounds.

Another object of the present invention is to provide certain specified syntheses for preparing the compounds.

Other objects of the invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description.

This invention is concerned with certain dyes within the general formula:

(1) 

wherein R represents hydrogen or an alkyl group, preferably a lower alkyl group comprising from 1 to 5 carbon atoms, inclusive, for example methyl, ethyl, etc.; Z represents a benzenoid developing group, preferably comprising an aryl group selected from the group consisting of benzene and naphthalene nuclei substituted by at least two groups selected from the group consisting of hydroxyl and amino groups, at least one of said groups being substituted in one of ortho and para positions with respect to one other of said groups; $n$ is 0 or 1; $a$ is 1 or 2; and D represents the residue of a dye molecule

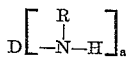

wherein $a$ has the same significance as previously noted; specifically dyes of the formula:

2) 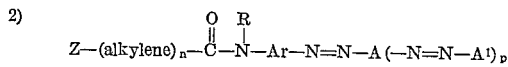

wherein Z, $n$ and R have the same significance as previously noted; $p$ is 1 or 2; Ar is an aryl group, preferably of the benzene or naphthalene series, which aryl group may be further substituted, as for example, by alkyl, halogen, alkoxy, acid (e.g., carboxyl, sulfo, etc.), sulfonyl, aceyl, secondary amino, or tertiary amino (e.g., acyl amino, alkyl amino, etc.) groups, or a heterocyclic group such as a member of the pyrazolone series; and each of A and $A^1$ represents the residue of an azo coupling component, each of which coupling components may be the same or different and comprises a coupler having an atom, preferably a hydrogen atom, displaced from the coupling position, thereof by means of a coupling reaction with a diazonium compound.

As illustrations of suitable azo coupling components or couplers from which A and $A^1$ may be derived, mention may be made of phenols and aromatic amines having a free position ortho or para to the hydroxyl or amino group, e.g., phenol, anilines, naphthols, anthrols, naphthylamines, etc.; heterocyclic aromatic compounds containing hydroxyl or amino groups, such as pyrazolones or pyrroles; aliphatic or alicyclic activated methylene couplers, i.e., compounds having an aliphatic or alicyclic methylene group activated by two adjacent keto, aldehyde, ester or nitrile groups, which may be the same or different, or a keto, aldehyde, ester or nitrile group in combination with an amide group, e.g., 1,3-diketones or β-ketonic acid arylamides; etc., and substituted derivatives thereof. Examples of groups which may be present in such substituted derivatives include alkyl, sulfo, alkoxy, aryl, aryloxy, amino, keto, alkylamino, arylamino, hydroxyl, cyano, alkylamido, arylamido, carbalkoxy, carboxamido, sulfonamido, etc.

As used herein with reference to A and $A^1$, the expression "residue of a phenolic coupler" is intended to refer to hydroxyphenyl, hydroxynaphthyl, hydroxyanthryl, etc. radicals, and substituted derivatives thereof; the expression "residue of an aromatic amino coupler" is intended to refer to aminophenyl, aminonaphthyl, etc. radicals, and substituted derivatives thereof; and the expressions "residue of a heterocyclic aromatic coupler," "residue of an aliphatic activated methylene coupler" and "residue of an alicyclic activated methylene coupler" are to be similarly construed.

The term "alkylene" as set forth in the generic formula is intended to include both straight and branched chain type alkylene groups and preferably comprises from 1 to 5 carbon atoms, inclusive.

It has been discovered that the dyes of Formula 2 may be prepared by diazotizing a compound of the formula:

(3) 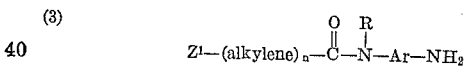

wherein $n$, R and Ar have the same significance as previously noted; and $Z^1$ represents the protected derivative of a benzenoid developing group, preferably the acylated derivative thereof, more preferably an o-bis-acyloxyphenyl or a p-bis-acyloxyphenyl groups; coupling the diazotized compound into the desired coupling component A; and removing the protective groups of $Z^1$. The protecting or insulating groups are removed prior to photographic utilization of the dyes, for example, removal of the acyloxy protective groups of $Z^1$ to provide thereby hydroxyl groups, the removal being accomplished for example, by hydrolysis in the presence of alkali.

The term "acyloxy" is intended to signify the grouping

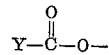

wherein Y is an aryl, alkyl, aryloxy, or alkoxy group. The terms "alkyl" and "aryl" as employed herein are intended to include substituted aryl and alkyl groups, for example, aralkyl and alkaryl groups.

The compounds of Formula 1 are disclosed and claimed in the copending U.S. application of Elkan R. Blout, Saul G. Cohen, Milton Green, Howard G. Rogers, Myron S. Simmon and Robert B. Woodward, Serial No. 1,442, filed January 11, 1960.

The compounds of Formula 3 are disclosed and claimed in the copending U.S. application of Milton Green, Helen P. Husek and Sidney Kosman, Serial No. 709,001, filed January 15, 1958.

Generally these compounds are prepared by condensing a compound of the formula:

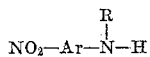

wherein R and Ar have the same significance as previously noted; with a compound of the formula:

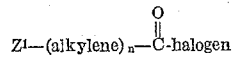

wherein $Z^1$ and $n$ have the same significance as previously noted; and directly reducing the nitro group to provide the primary amino group.

The coupling component employed to provide the residue A may be a coupler containing a diazotizable amino group. It is to be understood, however, that one may employ a coupler having a group convertible to a diazotizable amino group, e.g., a nitro group, and that the diazotizable amino group may be on a nucleus other than the nucleus substituted by the azo grouping. Thus, where a disazo compound is desired, that is, where $p$ is 1 in the previously stated formula, the monoazo intermediates may be employed, in subsequent diazotization and coupling steps, prior to removal of the acyloxy protective groups of $Z^1$. For example, the initial coupling may be into 2,5-dimethoxy-aniline and the resulting monazo product diazotized and coupled into the desired second coupler.

The coupling is generally performed at a pH which is preferably not greater than about 9.

By the use of two moles of the diazonium salt to each mole of the coupling component, one may couple twice into certain of the coupling components which provide the residue A, as, for example, phenols and aromatic amines which have two directing groups and two free coupling positions, such as 1,6-dihydroxy naphthalene and 1,5-diamino naphthalene.

Where the coupling component is a phenolic coupler, and particularly a naphthol, it has been found that coupling ortho to the hydroxyl group gives a dye developer of superior color properties. It has also been found that such ortho-coupled dye developers exhibit essentially no pH sensitivity over a fairly wide range on either side of neutral.

As examples of additional coupling components which may be employed to provide A and $A^1$, mention may be made of:

4-enzyl-1-naphthol
4-methyl-1-naphthol
4-methoxy-α-naphthylamine
4-acetamido-α-naphthylamine
Phenol
Aniline
1,5-naphthalenediamine
p-Cresol
1-hydroxyanthracene
1-hydroxy-2-naphthanilide
Diketohydrindene
Malonitrile
Acetoacetanilide The invention will be illustrated in greater detail in conjunction with the following specific examples which set out representative applications of the novel products and processes of this invention, which, however, are not limited to the details therein set forth and are intended to be illustrative only.

Example 1

0.011 mole of p-(2,5-bis-carbethoxyphenylacetamido)-aniline hydrochloride is dissolved in 0.033 mole of concentrated hydrochloric acid and 100 cc. of water. The mixture is cooled in an ice bath and diazotized at 0 to 5° C. with sodium nitrite. The resultant diazo solution is clarified and added, with constant stirring over a twenty minute interval, to a mixture of 0.01 mole of 4-methoxy-1-naphthol, 100 cc. of acetone, 150 cc. of saturated sodium bicarbonate solution, and 50 cc. of water. The resulting slurry is stirred, filtered and the filter cake subjected to a water wash. The resultant product,

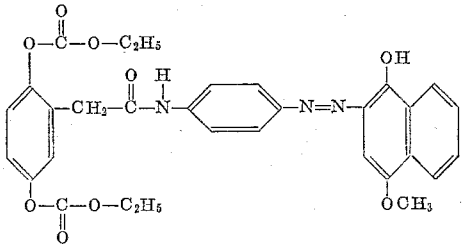

2-(p-[2',5'-bis-carbethoxyphenylacetamido] - phenylazo)- 4-methoxy-1-naphthol, is a magenta dye.

Example 2

The product of Example 1 is treated in vacuo with a solution containing 5 g. of potassium hydroxide in 15 cc. of water and 70 cc. of alcohol. The mixture is intermittently warmed in a steam bath for three minutes and the desired product precipitated from the mixture with dilute hydrochloric acid. Purification of the product is accomplished by dissolving the product in methyl cellosolve and reprecipitating with a 1% solution of hydrochloric acid. The resultant product,

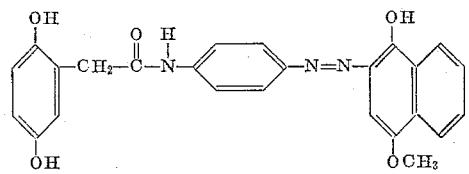

2-(p-homogentisamido - phenylazo) - 4 - methoxy - 1-naphthol, a magenta dye, exhibits a spectral absorption curve which displays a $\lambda_{max.}$ at 534 m$\mu$ in ethanol; $\epsilon=24,000$.

Example 3

1.76 g. of 4-(2',5'-bis - carbethoxyphenylacetamido)- 2,5-diethoxy-aniline hydrochloride is dissolved in 40 cc. of water, 3.5 cc. of 3 N hydrochloric acid is added, and the mixture cooled to approximately 0° C. in an ice bath. A solution of 0.25 g. of sodium nitrite dissolved in 5 cc. of water is added to the mixture with constant stirring. The resultant diazo solution is added, with constant stirring, to 1.09 g. of 6-anilino-3-sulfo-1-naphthol dissolved in 50 cc. of water at a pH of 7 to 8, precipitated with dilute hydrochloric acid and the filter cake washed with water. Purification of the product is accomplished by dissolving the product in acetone and reprecipitating with dilute hydrochloric acid. The resultant product,

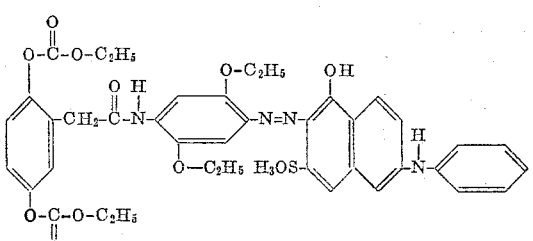

6-anilino-2-(4'-[2'',5'' - bis - carbethoxyphenylacetamido]- 2',5'-diethoxyphenylazo) - 3 - sulfo-1-naphthol, a magenta dye, exhibits a spectral absorption curve which displays a $\lambda_{max.}$ at 530 m$\mu$ in acetone; $\epsilon=25,000$.

Example 4

The product of Example 3 is hydrolyzed according to the procedure disclosed in Example 2 to provide

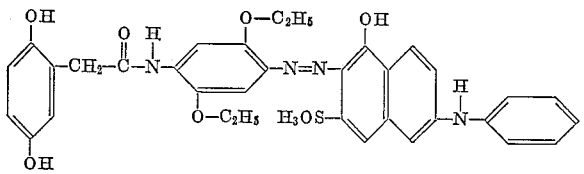

6-anilino-2-(2',5'-diethoxy-4' - homogentisamido - phenylazo)-3-sulfo-1-naphthol.

Example 5

2.6 g. (0.005 mole) of 4-(2',5'-bis-carbethoxyphenylacetamido) - 2,5 - diethoxy-aniline hydrochloride is dissolved in 50 cc. of water and 1.8 cc. (0.0225 mole) of 12.5 N hydrochloric acid. The mixture is cooled in an ice bath, diazotized at 0 to 5° C. with sodium nitrite and clarified. The resultant clear yellow diazo solution is added, with constant stirring over a twenty-minute interval, to a mixture of 1 g. (0.005 mole) of 4-acetamido-1-naphthol, 110 cc. of acetone, 15 cc. of pyridine, 50 cc. of saturated sodium bicarbonate solution, and 2.4 g. (0.018 mole) of sodium acetate. The resulting slurry is stirred for two hours and filtered. The filter cake is washed initially with a sodium bicarbonate solution and then with water. The resultant product,

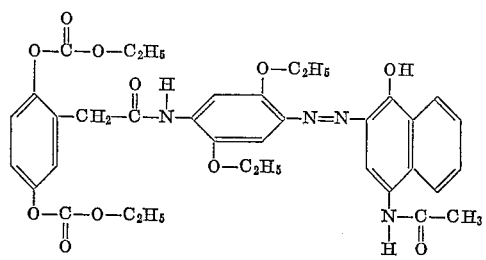

4-acetamido - 2 - (4'-[2'',5'' - bis - carbethoxyphenylacetamido]-2',5'-diethoxyphenylazo)-1-naphthol, is a magenta dye.

Example 6

The product of Example 5 is hydrolyzed according to the procedure disclosed in Example 2 and the product thereof is purified by dissolving in a methyl cellosolve-alcohol mixture and reciprocating with a 5% hydrochloric acid solution. The precipitate is washed initially with a 2:1 water-alcohol mixture and then with water. The resultant product,

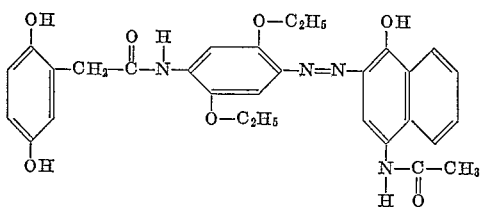

4-acetamido - 2 - (2',5' - diethoxy - 4' - homogentisamidophenylazo)-1-naphthol, a magenta dye, exhibits a spectral absorption curve which displays a $\lambda_{max.}$ at 570 m$\mu$ in pyridine; $\epsilon=22{,}700$.

Example 7

5.25 g. (0.011 mole) of 4-(2',5'-bis-carbethoxyphenylacetamido)-2-methoxy-aniline hydrochloride is dissolved in 1.8 cc. (0.022 mole) of concentrated hydrochloric acid, 100 cc. of water, and 10 cc. of acetone. The mixture is diazotized at 0 to 5° C. with 0.76 g. (0.011 mole) of sodium nitrite in 10 cc. of water. The diazo solution is stirred for 15 minutes and filtered. The diazo solution is then added dropwise, at 5° C., to a solution comprising 2.51 g. (0.01 mole) of 4-N,N-dimethylsulfonamido-1-naphthol, 4 g. of sodium bicarbonate, 200 cc. of water, 100 cc. of acetone, and 5 drops of pyridine. The resultant slurry is stirred for one hour. The resultant product,

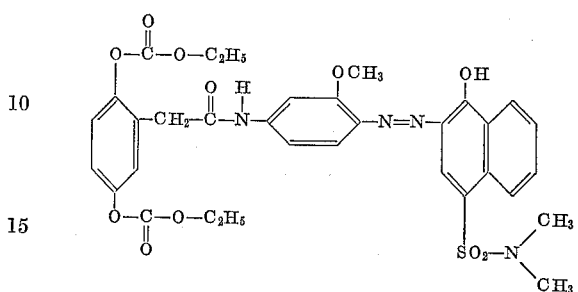

2-(4'-[2'',5''-bis-carbethoxyphenylacetamido] - 2' - methoxyphenylazo)-4-N,N-dimethylsulfamyl-1 - naphthol, is a thick oil which separates out.

Example 8

The product of Example 7 is dissolved in 30 cc. of alcohol and 100 cc. of water. To the mixture, warmed on a steam bath, in a nitrogen atmosphere, is added 6 g. (0.1 mole) of potassium hydroxide in 25 cc. of water. The mixture is heated for 30 minutes, filtered and the product precipitated with excess dilute hydrochloric acid. The resultant product,

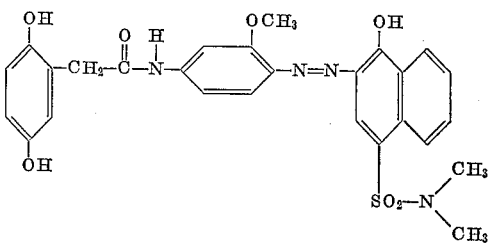

4 - N,N - dimethylsulfamyl - 2-(4'-homogentisamido-2'-methoxy - phenylazo)-1-naphthol, melting point 160 to 162° C., exhibits a spectral absorption curve which displays a $\lambda_{max.}$ at 507 m$\mu$ in methyl cellosolve; $\epsilon=28{,}200$.

Analysis of this product as $C_{27}H_{26}N_4O_7S$:

|  | C | H | N | S |
| --- | --- | --- | --- | --- |
| Calculated | 58.9 | 4.7 | 10.2 | 5.8 |
| Found | 56.4 | 5.1 | 11.3 | 6.6 |

Example 9

A diazo solution formed according to the procedure disclosed in Example 7 is added dropwise, at 5° C., to a solution comprising 0.01 mole of 8-acetamido-2-naphthol, 4 g. of sodium bicarbonate, 200 cc. of water, 100 cc. of acetone, and 5 drops of pyridine. The resultant slurry is stirred for one hour to provide the product,

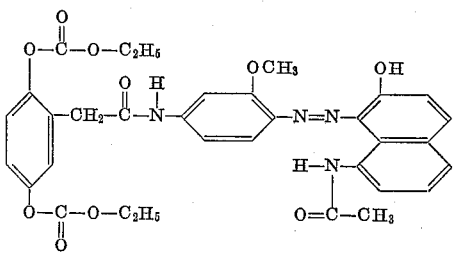

8-acetamido-1-(4' - [2'',5'' - bis - carbethoxyphenylacetamido]-2'-methoxyphenylazo)-2-naphthol.

Example 10

The product of Example 9 is hydrolyzed according to the procedure disclosed in Example 8. The resultant product,

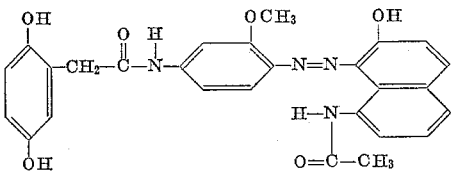

8-acetamido-1-(4'-homogentisamido-2'-methoxy - phenylazo)-2-naphthol, melting point 256 to 257° C., exhibits a spectral absorption curve which displays a $\lambda_{max.}$ at 535 m$\mu$ in methyl cellosolve; $\epsilon$=22,600.

Analysis of this product as $C_{27}H_{24}N_4O_6$:

|  | C | H | N |
|---|---|---|---|
| Calculated | 64.9 | 4.8 | 11.2 |
| Found | 62.3 | 5.2 | 10.8 |

Example 11

3.6 grams of 4-(2',5'-diacetoxyphenylcarboxamido)-aniline hydrochloride in 2.4 cc. of 12.5 N hydrochloric acid, and 50 cc. of water is diazotized at 10° C. with a solution comprising 0.7 gram of sodium nitrite and 10 cc. of water. The diazonium mixture is clarified, and added at 10-15° C., over a time interval of ten minutes, to a mixture comprising 1.6 grams of 3-methyl-1-phenyl-5-pyrazolone, 1.8 cc. of 5 N sodium hydroxide, 75 cc. of water, 40 cc. of a saturated sodium bicarbonate solution, and 5 cc. of pyridine. The resultant slurry, exhibiting a pH of approximately 7, is stirred for two hours, filtered, and the filter cake washed with water to provide the product,

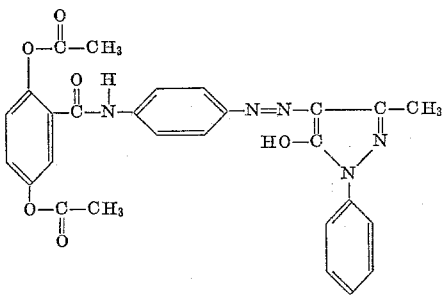

4-(p-[2',5'-diacetoxyphenylcarboxamido] - phenylazo)-3-methyl-1-phenyl-5-pyrazolone.

Example 12

The product of Example 11 is hydrolyzed by mixing with 4.0 grams of potassium hydroxide, 20 cc. of water, and 60 cc. of alcohol and heating, in vacuo, for three minutes. The mixture is cooled and poured directly into dilute hydrochloric acid. The resultant slurry is filtered and the filter cake washed with water. The filter cake is then dissolved in a minimum of hot methyl cellosolve, clarified, and precipitated with hydrochloric acid. The precipitate is separated by filtration and the filter cake redissolved and reprecipitated twice. The final product,

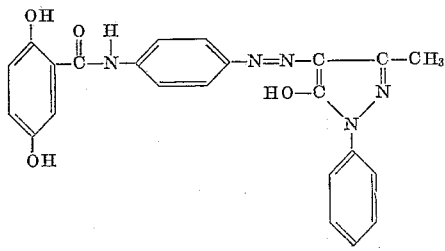

4 - (p - gentisamido - phenylazo) - 3 - methyl - 1 - phenyl-5-pyrazolone, exhibited a $\lambda_{max.}$ at 450 m$\mu$ in pyridine; $\epsilon$=35,000.

Substitution of appropriate starting materials in the above examples, such as, for example, substituting one or more of the previously enumerated couplers, provides additional compounds within the previously stated generic formula. For example, 2-(2',5'-dimethoxy-4'-homogentisamido-phenylazo)-4-aceto-1-naphthol may be prepared by diazotizing a protected derivative of 2,5-dimethoxy-4-homogentisamido-aniline, coupling the diazonium product thereof with 4-aceto-1-naphthol, and then removing the protecting groups from the dihydroxyphenyl radical. 2 - (2',5' - dichloro-4'-homogentisamido - phenylazo)-4-methoxy-1-naphthol may be prepared by diazotizing a protected derivative of 2,5-dichloro-4-homogentisamido-aniline, coupling the diazonium product thereof with 4-methoxy-1-naphthol, and then removing the protecting groups from the dihydroxyphenyl radical.

Since certain changes may be made in the above processes and products without departing from the scope of the invention herein involved, it is intended that all matter contained in the above description shall be interpreted as illustrative and not in a limiting sense.

What is claimed is:

1. The process of preparing compounds of the formula:

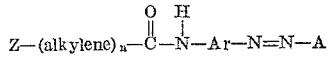

wherein Z is p-dihydroxyphenyl; A represents the residue of an azo coupler; $n$ is selected from the group consisting of 0 and 1; and Ar is selected from the group consisting of arylene and lower alkoxy substituted derivatives thereof; which comprises diazotizing a compound of the formula:

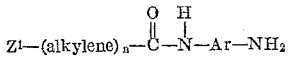

wherein $Z^1$ represents an acylated derivative of said Z, coupling the diazo product thereof with said azo coupler; and hydrolyzing the resulting product to effect removal of the protecting groups.

2. The process as defined in claim 1, wherein said coupler contains a diazotizable amino group, including the steps of diazotizing said amino group and coupling the diazo product with a second coupler.

3. The process of preparing 2-(p-homogentisamido-phenylazo)-4-methoxy-1-naphthol which comprises diazotizing p - (2,5 - bis-carbethoxyphenylacetamido) - aniline, coupling the diazo product thereof with 4-methoxy-1-naphthol to provide 2-(p-[2',5'-bis-carbethoxyphenylacetamido]-phenylazo)-4-methoxy-1-naphthol, and effecting removal of the carbethoxy groups by hydrolysis.

4. The process of preparing 6-anilino-2-(2',5'-diethoxy-4'-homogentisamido-phenylazo)-3-sulfo-1-naphthol which comprises diazotizing 4-(2',5'-bis-carbethoxyphenylacetamido)-2,5-diethoxy-aniline, coupling the diazo product thereof with 6-anilino-3-sulfo-1-naphthol to provide 6-anilino - 2 - (4' - [2'',5''-bis-carbethoxyphenylacetamido]-2',5'-diethoxy-phenylazo)-3-sulfo-1-naphthol, and effecting removal of the carbethoxy groups by hydrolysis.

5. The process of preparing 4-acetamido-2-(2',5'-diethoxy-4'-homogentisamido-phenylazo)-1-naphthol which comprises diazotizing 4-(2',5'-bis-carbethoxyphenylacetamido)-2,5-diethoxy-aniline, coupling the diazo product thereof with 4-acetamido-1-naphthol to provide 4-acetamido-2-(4'-[2'',5''-bis carbethoxyphenylacetamido]-2',5'-diethoxy-phenyl)-1-naphthol, and effecting removal of the carbethoxy groups by hydrolysis.

6. The process of preparing 8-acetamido-1-(4'-homogentisamido-2'-methoxy-phenylazo) - 2 - naphthol which comprises diazotizing 4-(2',5'-bis-carbethoxyphenylacetamido)-2-methoxy-aniline, coupling the diazo product thereof with 8-acetamido-2-naphthol to provide 8-acetamido - 1 - (4' - [2'',5'' - bis - carbethoxyphenylacetamido]-2'-methoxy-phenylazo)-2-naphthol, and effecting removal of the carbethoxy groups by hydrolysis.

7. The process of preparing 4-N,N-dimethylsulfamyl-2-(4'-homogentisamido - 2' - methoxy - phenylazo)-1-naphthol which comprises diazotizing 4-(2',5'-bis-carbethoxyphenylacetamido)-2-methoxy - aniline, coupling the diazo product thereof with 4-N,N-dimethylsulfamyl-1-naphthol to provide 2-(4'-[2'',5''-bis-carbethoxyphenylacetamido]-2'-methoxyphenylazo) - 4 - N,N - dimethylsulfamyl-1-naphthol, and effecting removal of the carbethoxy groups by hydrolysis.

8. The process of preparing 4-(p-gentisamido-phenylazo)-3-methyl-1-phenyl-5-pyrazolone which comprises diazotizing 4-(2',5'-diacetoxyphenylcarboxamido) - aniline, coupling the diazo product thereof with 3-methyl-1-phenyl-5-pyrazolone to provide 4-(p-[2',5'-diacetoxyphenylcarboxamido] - phenylazo)-3-methyl-1-phenyl-5-pyrazolone, and effecting removal of the acetoxy groups by hydrolysis.

References Cited in the file of this patent
UNITED STATES PATENTS

| | | |
|---|---|---|
| 1,925,434 | Clingestein et al. | Sept. 5, 1933 |
| 2,128,256 | Krzikalla et al. | Aug. 30, 1938 |
| 2,983,606 | Rogers | May 9, 1961 |
| 3,009,958 | Green et al. | Nov. 21, 1961 |